July 22, 1958    E. P. TURNER ET AL    2,844,773
INDUCTION MOTOR CONTROL SYSTEMS
Filed April 2, 1957
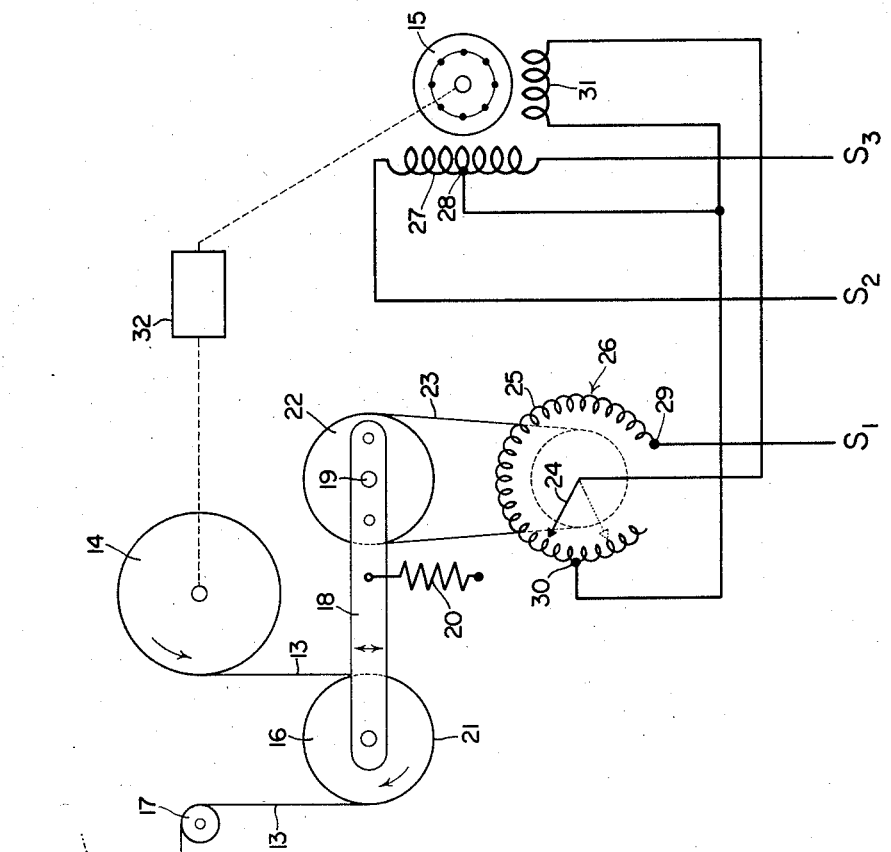
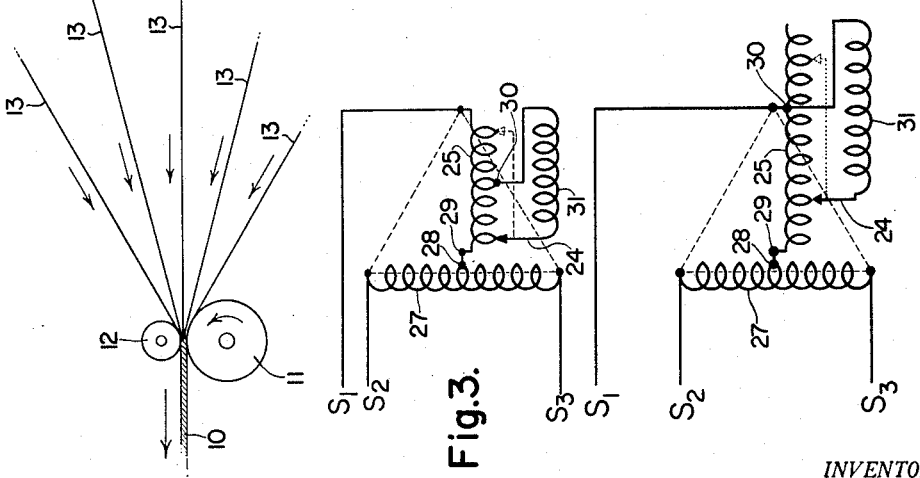
INVENTORS
Edgar P. Turner
John A. Herr
WITNESS
William Martin
BY Marshall J. Breen
ATTORNEY United States Patent Office 2,844,773
Patented July 22, 1958

2,844,773

INDUCTION MOTOR CONTROL SYSTEMS

Edgar P. Turner, Watchung, and John A. Herr, Garwood, N. J., assignors to The Singer Manufacturing Company, Elizabeth, N. J., a corporation of New Jersey Application April 2, 1957, Serial No. 650,257

5 Claims. (Cl. 318—6)

This invention relates to speed control systems for induction motors and more specifically relates to a system for controlling motors for driving the supply reels feeding wire to a cabling machine at a rate to produce substantially constant tension in the wire.

It is clear that, in cabling machines having substantially constant linear speed cable-driving means and individual reel drives for the wire, some control of the reel rotational speed is necessary to compensate for changing diameter as the reel is unwound.

It is also essential that braking torques be instantly applied to the wire supply reels in the event of wire breakage or stoppage of the cable drive to prevent undue spillage of wire from the reels.

It is a primary object of this invention, therefore, to provide a system for automatically controlling the angular speed of supply reel driving motors to match the pay-off rate to the cable driving rate to produce a substantially constant tension in the wire.

A further object of this invention is to provide a system for controlling supply reel motors in which loss of tension in the wire causes reversing torque to be applied by the motors with attendant braking of the reels and even reversal thereof where necessary.

With the above and other objects in view, as will hereinafter appear, the invention comprises the device, combination and arrangements of parts hereinafter set forth and illustrated in the accompanying drawings of a preferred embodiment of the invention, from which the several features of the invention and the advantages attained thereby, will be readily understood by those skilled in the art.

In the drawings:

Fig. 1 is a schematic diagram of a motor control system according to this invention.

Fig. 2 is a schematic diagram of a motor control system which may be employed in the alternative with respect to the system of Fig. 1.

Fig. 3 is a schematic diagram illustrating a further modification of the motor control system of Fig. 1.

Referring now to Fig. 1, 10 represents cable being driven in the direction of the arrow by driven roller 11 and idler 12. Several wires 13 are supplied to form the finished cable 10; each wire 13, or sometimes a pair of wires, being supplied from a supply reel 14 driven through a gear reduction unit 32 by a low-inertia induction motor 15 of the type shown and described in the U. S. Patent No. 2,438,372. The wire 13 is led from the supply reel 14 around a dancer roll 16 thence with a quarter turn around a fixed idler roller 17 and to the cable drive 11, 12.

The dancer roll 16 is mounted for rotation on a torque arm 18 pivoted at 19 and biased downwardly by a tension spring 20 to create a normal loop 21 in the wire. Secured for rotation with the arm 18 is a pulley 22 which is connected by a belt 23 to drive a contact slider 24 which makes sliding contact with coils of a single stationary winding 25 of a variable transformer 26 of conventional form and generally known in the trade as a Variac.

A three-phase supply of electrical energy, indicated as $S_1$—$S_2$—$S_3$, has one phase $S_2$—$S_3$ connected across a main winding 27 of the induction motor 15. The main winding 27 is supplied with a mid-tap 28.

The winding 25 of the variable transformer 26 has an input portion included between one end 29 and an intermediate tap 30. An output portion of the winding 25 is included between the slider 24 and the intermediate tap 30. It is clear that, by movement of the slider 24, the voltage induced in the output portion of the winding 25 may be made any desirable fraction of the input voltage including zero and negative or reversed-phase values. This output voltage is impressed upon a control winding 31 of the induction motor 15 by connections thereto from the slider 24 and the intermediate tap 30 as shown.

The input voltage to the variable transformer 26 is derived between the mid-tap 28 of winding 27 and supply terminal $S_1$, which constitutes the well-known Scott or T-connection and provides a 90 electrical degree phase shift between the voltage applied to the main winding 27 and that applied to the input portion of the variable transformer winding 25. Since the variable output voltage of the transformer 26 is either in phase agreement with or in phase opposition to this input voltage depending upon the position of the slider 24 relative to the tap 30, and since the output voltage is impressed on the control winding 31 it is clear that the induction motor 15 will receive two-phase variable excitation to cause it to rotate in either direction or to stand still depending on the position of the slider 24 relative to the tap 30.

It is clear that the wiring diagram of Fig. 1 is not the only one that may be employed according to this invention. Thus Fig. 2 shows a diagram of connections which may be used in the alternative with respect to that of Fig. 1 and in which the input portion of winding 25 of the variable transformer 26 is reversed with respect to its connection between the mid-tap 28 of the main winding and the supply terminal $S_1$.

The modification of Fig. 3 utilizes the complete winding 25 of the transformer 26 as the input portion and places the intermediate top 30 at the mid-point for effecting equal control range for both directions of rotation. The basic operation of all three systems illustrated is the same and will now be described with respect to Fig. 1.

Operation

Under normal wire-feeding conditions, as shown in Fig. 1, the slider 24 is positioned away from the tap 30 to cause voltage to be applied to winding 31 of such phase and magnitude that motor 15 drives the supply reel 14 to supply wire 13 at substantially the same linear rate as the cable drive 11—12 uses it; thus the loop 21 remains the same size and no change in the angular position of the torque arm results. If, however, due to decreasing diameter of the wire mass on the supply reel, the linear supply rate tends to decrease below the rate demanded by the cable drive, the loop 21 would shorten and the torque arm 18 would rotate clockwise against the spring 20 and move the slider 24 to a new balancing position for supplying more voltage to the control winding 31 and thus increase the angular speed of the motor 15 and thus, of the reel 14, to make the linear supply rate again equal the demand rate of the wire 13. The spring 20 is a low rate spring so that the tension change for considerable movement of the torque arm is quite small. In this manner the tension in the wire 13 does not vary substantially over the usual changes in effective reel diameter found in practice.

In the event of the sudden stoppage of the cable drive 11—12 the loop 21 lengthens and the torque arm 18 turns counterclockwise to move the slider 24 past the tap 30, thus reversing the phase of the voltage applied to the control winding 31 and reversing the torque applied to the reel 14 by the motor 15 and bringing it to a quick stop and if necessary reversal. This quick torque-reversal action is of great practical importance where wire breakage would normally, in the absence of this feature, be accompanied by serious wire spillage causing costly delays in restoring production. With this feature, the wire is merely wound back onto the supply reel and detection of a break is readily made by observing a backward rotation of a supply reel.

It is preferable but not necessary that a low-inertia motor be used in this invention due to its inherently high acceleration and deceleration rates which have a beneficial effect on the response time of the entire system.

While this invention has been described in reference to a cabling machine, it is not to be construed as limited thereto but includes within its scope any application wherein a linear strand must be controlled so that the pay-off rate of the supply matches the demand rate of the wind-up.

Having thus set forth the nature of the invention, what we claim herein is:

1. A motor control system for controlling the supply of wire to a cabling machine comprising a two-phase induction motor having a main winding for substantially constant excitation and a control winding for variable excitation, means to subject said control winding to potentials differing in phase and amplitude with respect to the potential impressed upon said main winding including a three-phase supply of electrical energy having one phase connected to said main winding, a mid-tap for the main winding, a variable auto-transformer having a single winding, at least a part of which is connected between the mid-tap of the main winding and the common junction of the other two phases, a contact slider for said transformer, an intermediate tap for said transformer, and means responsive to the tension of the wire to move said slider, said control winding being connected between the slider and the intermediate tap of said transformer.

2. A motor control system for driving the supply reels for feeding wire to a cabling machine comprising a three-phase supply of electrical energy, a two-phase low-inertia induction motor for driving said reels and having a main winding connected to one phase of said supply, a mid-tap for said main winding, a single-winding variable auto-transformer having an input portion connected between the common junction of the other two phases of the supply and the mid-tap of the main winding, a contact slider and an intermediate tap for said transformer, and means responsive to the tension of the wire to move said slider, and a control winding for said induction motor connected between the slider and the intermediate tap of said transformer.

3. A system for feeding wire to a cabling machine comprising cable-driving means and individual supply reels for feeding wire to the cable-driving means, a low-inertia induction motor for driving each supply reel, each motor having a main winding with a mid-tap and a control winding, a three-phase electric power source having one phase connected to said main winding, a dancer roll riding on the wire between the supply reel and the cable driving means and biased to form a wire loop which varies in size responsive to the difference in the wind-up and supply feed rates of the wire, a variable, single-winding transformer connected at least in part between the mid-tap of the main winding of the motor and the common junction of the other two phases of said source, an intermediate tap for the transformer, and a sliding contact for the transformer operatively connected to the dancer roll to move in response to changes in the size of the wire loop, said control winding being connected between the slider and the intermediate tap of the transformer.

4. A motor control system for driving the supply reels for feeding wire to a cabling machine comprising a three-phase supply of electrical energy, a two-phase low-inertia induction motor for driving said reels and having a main winding connected to one phase of said supply, a mid-tap for said main winding, a single-winding variable auto-transformer having an input portion connected between the common junction of the other two phases of the supply and the mid-tap of the main winding, an intermediate tap and a contact slider for said transformer, means for detecting a condition of said wire, means responsive to said condition to move said slider, and a control winding for said induction motor connected between the slider and the intermediate tap of said transformer.

5. A motor control circuit comprising a two-phase induction motor the speed of which is to be controlled, said motor including a main winding having a mid-tap and a separate control winding, a three-phase supply of electrical energy having one phase connected across said main winding, a variable transformer having a single winding connected between the mid-tap of the main winding and the common junction of the other two phases of the supply, and an intermediate tap and a slider contact for said transformer which define the terminals of an output portion of said transformer to which is connected the control winding of said motor.

No references cited.